W. R. LYNCH.
VALVE.
APPLICATION FILED DEC. 3, 1912.
1,187,002.
Patented June 13, 1916.
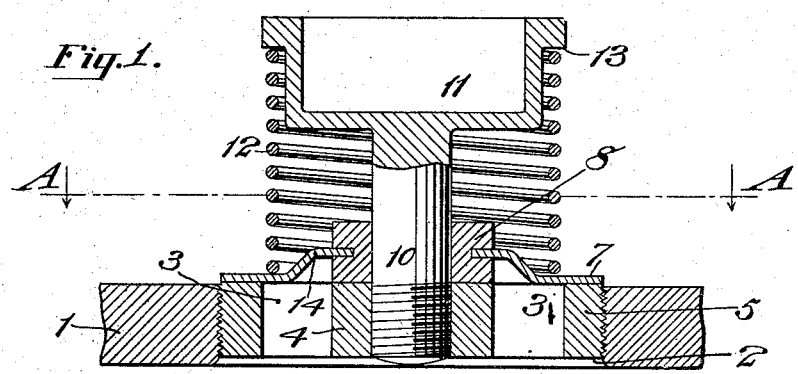
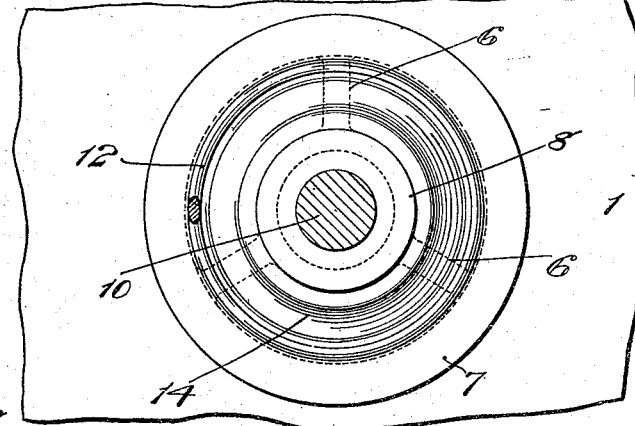
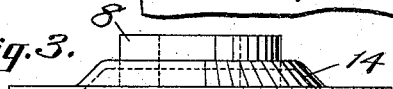
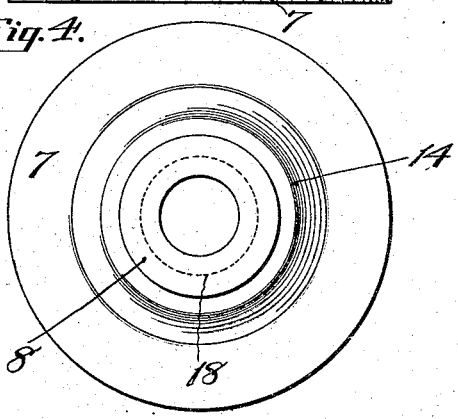
Witnesses:—
Inventor:
William R. Lynch
by his attorneys
THE COLUMBIA PLANOGRAPH CO., WASHINGTON, D. C.

UNITED STATES PATENT OFFICE.

WILLIAM R. LYNCH, OF NEW YORK, N. Y.

VALVE.

1,187,002.      Specification of Letters Patent.      Patented June 13, 1916.

Application filed December 3, 1912. Serial No. 734,715.

*To all whom it may concern:*

Be it known that I, WILLIAM R. LYNCH, a citizen of the United States, and resident of the borough of Manhattan, in the city and State of New York, have invented a new and useful Improvement in Valves, of which the following is a specification.

The object of this invention is to provide certain improvements in the construction, form and arrangement of the several parts of a valve whereby it will be comparatively light and durable and capable of use in pumps where quick action is required.

A further object is to provide a valve that will be silent in operation and one that will eliminate the hammering or pounding on the valve seat, which hammering tends to injure the edge of its seat and cause leakage.

A still further object is to provide a valve that is inexpensive and one that will not become chipped or cracked by constant striking of the valve seat.

A practical embodiment of my invention is represented in the accompanying drawings, in which, Figure 1 represents in section a portion of a fluid pump with the valve applied thereto. Fig. 2 represents a horizontal section taken in the plane of the line A—A of Fig. 1. Fig. 3 represents in side elevation the valve proper removed from its stem, and Fig. 4 represents a plan view of the same.

The wall of the pump is denoted by 1, and is provided with the usual discharge port 2. The valve seat has one or more fluid passages 3 therethrough, the inner and outer portions 4, 5, of the said valve seat being connected by one or more ribs 6. The outer portion 5 of the valve seat is screwed or otherwise secured into the discharge port 2. The valve disk 7 is formed of sheet or rolled metal having a hole therethrough for the reception of the hub 8. In the form shown in Figs. 1, 2, a stem 10 passes through the hub and is screwed into the inner portion 4 of the valve seat. The valve stem 10 is further provided with a cup-shaped head 11. A coil spring 12 is interposed between the valve disk 7 and a peripheral flange 13 on the cup-shaped head 11, which spring serves to hold the valve normally closed. I have shown the valve disk 7, having a dished central portion 14, which serves to stiffen the valve as well as form a recess for the lower portion of the hub on the contact side of the valve.

In order to construct a valve that will be efficient and cheap in the manufacture, I cut or stamp out the disk with a hole 18 from sheet or rolled metal of the required thickness. The hub and disk are interlocked by causing the metal of the hub to overlap the walls of the hole through the disk. This may be accomplished by either flowing or expanding the metal of the hub. One way of doing this would be as follows. Insert the metal hub 8, the hub extending a distance above and below the disk according to the position of the disk desired. Pressure is then applied to the top and bottom of the hub, which pressure causes the metal to flow or expand over the edges of the hole in the disk, thereby firmly embedding the disk in the hub and making a perfectly tight joint.

It is to be understood that while I have shown the valve disks circular in plan, I might make them of any desired shape without departing from the spirit and scope of my invention, but

What I claim is:

A valve consisting of a disk of metal having a central opening, the wall of the opening being turned at a pronounced angle to the body of the disk to form a strengthening flange, the edge of the flange being turned inwardly in a plane approximately parallel to the body of the disk and a hub extending through the opening in the valve and embracing said inwardly turned edge leaving the exterior surface of the flange exposed.

In testimony that I claim the foregoing as my invention, I have signed my name in presence of two witnesses, this twenty-sixth day of November, 1912.

WILLIAM R. LYNCH.

Witnesses:
  F. GEORGE BARRY,
  OTTO W. HOLMGREN.